Jan. 20, 1959  H. NEFF  2,870,337
X-RAY DIFFRACTION SYSTEM
Filed April 8, 1955
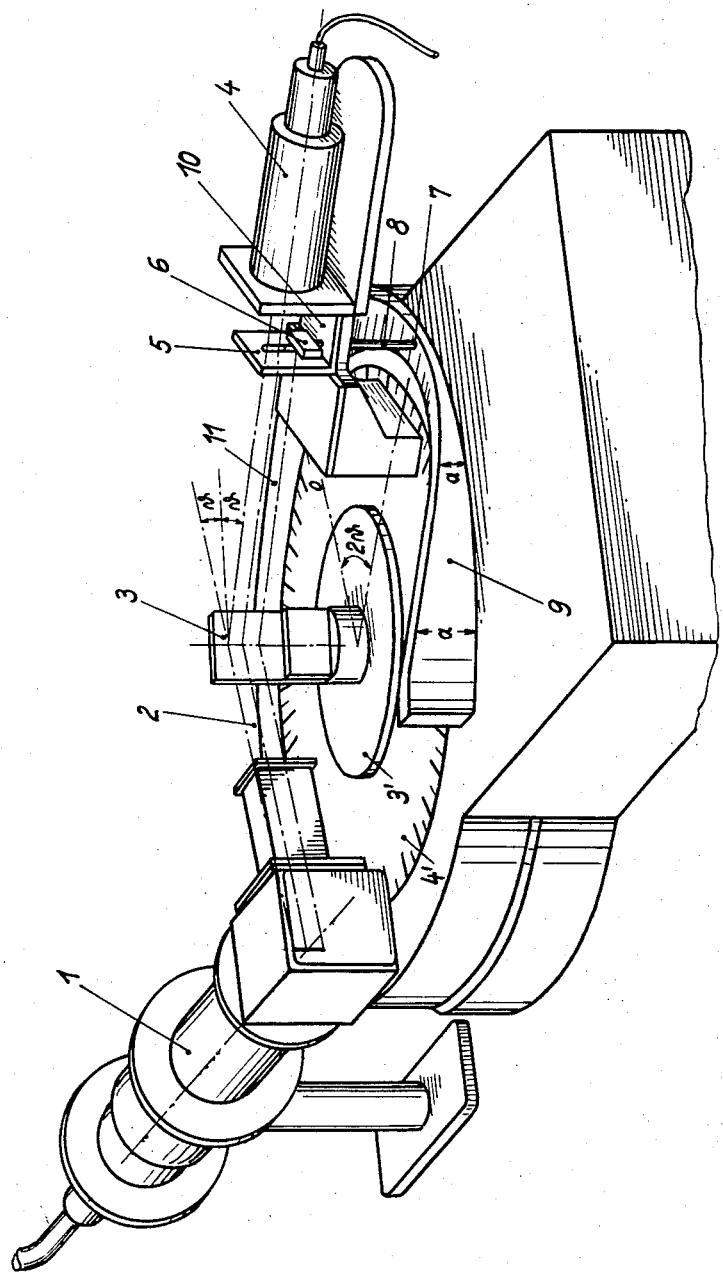

`2,870,337`
Patented Jan. 20, 1959

United States Patent Office

2,870,337
X-RAY DIFFRACTION SYSTEM

Hans Neff, Erlangen, Germany, assignor to Siemens-Reiniger-Werke Aktiengesellschaft, Erlangen, Germany, a corporation of Germany Application April 8, 1955, Serial No. 500,051

Claims priority, application Germany April 9, 1954

5 Claims. (Cl. 250—53)

This invention relates to an apparatus for analysing test bodies by X-ray diffraction and for taking X-ray diffraction patterns of the specimens.

In such apparatus, the intensity of the diffracted X-rays within the diffraction spectrum of a test body normally varies by several decimal powers in dependence upon the angle of diffraction and thus requires a device for taking the X-ray diffraction pattern with a large control range.

It is an object of the present invention to provide means for eliminating or at least reducing the above indicated variations.

The invention proceeds from recognition of the fact that some of the factors determining the intensity of the diffracted X-rays in dependence upon the angle of diffraction are already known before taking the diffraction pattern.

The figure of the drawing illustrates, in perspective, an apparatus constructed in accordance with the present invention.

In connection with such known factors affecting the diffraction pattern, several formulas have been derived for the computation of the intensity of diffracted X-rays.

For instance, in the Debye-Scherrer method (see J. M. Bijvost, N. H. Kolkmeijer, C. H. MacGillavry "Röntgenanalyse von Kristallen," Springer-Verlag, Berlin 1940, page 55 and following) the intensity of diffracted X-rays is:

$$J = A \frac{1+\cos^2 2\vartheta}{\sin^2 \vartheta \cos \vartheta} h e^{-B\left(\frac{\sin \vartheta}{\lambda}\right)^2 S^2}$$

in which $A$=absorption factor for specimens in the form of rodlets or small rods, which factor can be derived from known tables as a function of the diffraction angle, as well as from the radius and the absorption coefficient of the specimen;
$\vartheta$=one half of the diffraction angle;
$h$=surface frequency factor, that is, the number of planes or surfaces to be traversed by the X-rays;
$B$=a temperature dependent constant which depends upon the vibrational amplitude of the atoms in the lattice of the specimen;
$S$=structure factor; and
$\lambda$=wave length of the X-rays.

In the Bragg-Brentano method the intensity of a refracted X-ray is given by the formula $$J = \frac{1+\cos^2 2\vartheta}{\sin^3 \vartheta \cos \vartheta} h e^{-B\left(\frac{\sin \vartheta}{\lambda}\right)^2 S^2}$$

This formula differs from the formula for the Debye-Scherrer method merely by the absence of the absorption factor which can be neglected when using laminar specimens, and by a sin $\vartheta$ in the denominator. This sin occurs due to the fact that in the Bragg-Brentano method with growing angle $\vartheta$ and in case of a given constant cross section of the bundle of X-rays impinging upon the specimen less and less crystallites will take part in the diffraction, contrary to the Debye-Scherrer method, in which always the same number of crystallites diffracts the rays.

The angle-dependent factors of the diffraction intensity, known before taking the diffraction pattern of a specimen, are in the Debye-Scherrer method $$F_1 = A \frac{1+\cos^2 2\vartheta}{\sin^2 \vartheta \cos \vartheta}$$

and in the Bragg-Brentano method $$F_2 = \frac{1+\cos^2 2\vartheta}{\sin^3 \vartheta \cos \vartheta}$$

According to the present invention, in an apparatus for diffracting X-rays on specimens and for taking the diffraction patterns of these specimens, means are provided which cause a normalization to a constant value, by automatic control of the measured or recorded intensity of the X-ray diffracted by the specimen, in dependence upon the diffraction angle, inasmuch as angle-dependent factors of the diffraction intensity are concerned which are known before taking the diffraction pattern.

According to the invention, the intensity control is in the above mentioned examples effected as a function of the angle, that is, in such a way that in both cases the result of the measurement is $$J^x = h e^{-B\left(\frac{\sin \vartheta}{\lambda}\right)^2 S^2}$$

The two angle-dependent factors of the diffraction intensity (in the example $F_1$ or $F_2$) are used as a regulation function for the intensity control. The intensity differences within the diffraction diagram are thereby reduced by about one decimal power and for the rest admit direct conclusions—that is, without computation—to $J^x$, that is, to the unknown quantities "$h$," "$B$," and "$S$." The exponential function $$e^{-B\left(\frac{\sin \vartheta}{\lambda}\right)^2}$$

in most instances can be neglected, since with test temperatures far below the melting point of the specimen as a rule $$\frac{B}{\lambda^2} \ll 1$$

and hence $$e^{-B\left(\frac{\sin \vartheta}{\lambda}\right)^2}$$

as a function of the diffraction angle varies by only a very small amount.

Various means may be provided for realizing an automatic regulation, in dependence upon the diffraction angle, of the intensity of the X-rays diffracted by a specimen. The intensity of the diffracted X-rays may be regulated by varying the intensity of the source of the X-rays, as by controlling the filament power of the X-ray tube, or by controlling the sensitivity of the X-ray detector. In case the X-ray detector is a Geiger-Müller tube connected for integration, a variable resistance controlled by the regulation function may be connected in parallel with the instrument measuring the integrated impulse current, or the intensity of the impulses reaching the integrator may be controlled in accordance with the regulation function by a corresponding regulation of the anode voltage of the output stage of a univibrator. In case proportional counters are used as indicators of the X-rays, the voltage of the counter tube which determines the intensity of the impulses, or in the case of crystal counters with photoelectric multiplier devices connected thereto, the voltage on the multiplier stages may be varied in accordance with the regulation function.

In case the entire diffraction spectrum is photographed, an absorption foil rolled with a thickness which varies in accordance with the regulation function may be adjustably inserted in the path of the rays between the specimen and the photographic film.

A particularly simple and preferred arrangement for regulating the intensity comprises a diaphragm system with variable aperture for regulating the intensity of the X-rays impinging upon the X-ray indicator, as shown in the drawing, in a perspective view.

Referring to the drawing, a beam of X-rays 2 is emitted from an X-ray tube 1 towards the specimen 3 secured on a turntable 3' mounted in a base 11, and reflected by this specimen 3 at the Bragg angle. The reflected intensity is measured, by means of a Geiger-Müller tube 4 swivel-mounted on a turntable 4' which is accommodated in a recess or in a depression of the base 11, coaxial with the turntable 3'. Disposed ahead of the Geiger tube 4 is a diaphragm 5 which may be covered by a slide 6. The position of the slide 6 is determined by the level or height of the area 7 where the rod 8 carrying the slide 6 rests on a template or cam 9 which is cut in accordance with the regulation function, in such a way that $$a = F_1(\vartheta) = A \frac{1+\cos^2 2\vartheta}{\sin^2 \vartheta \cos \vartheta}$$

or $$a = F_2(\vartheta) = \frac{1+\cos^2 2\vartheta}{\sin^3 \vartheta \cos \vartheta}$$

"$a$" being the height of the template 9, and "$2\vartheta$" being the angle through which the turntable 4' has been turned with reference to a zero position in which the surface of the specimen 3 would be parallel to the beam of X-rays 2($\vartheta=0$).

The Geiger tube 4 and the diaphragm 5 are fixedly interconnected by means of a plate 10. If the turntable 3' with the specimen 3 is turned through an angle $\vartheta$, the Geiger tube 4 and the diaphragm 5 must be turned through a angle $2\vartheta$ in order to satisfy the law of reflection. The lower end 7 of the rod 8 carrying the slide or shutter 6 thereby slides along the template and is raised or lowered in accordance with the regulation function defined by the above formula for $a = F_{1,2}(\vartheta)$, whereby the slide or shutter 6 of the diaphragm 5 is moved similarly, thus varying the aperture of the diaphragm 5 and the intensity of the X-rays impinging on the Geiger tube in accordance with the regulation function.

The invention has been described in detail with respect to a now preferred example and embodiment thereof; it will be understood, however, that various changes and modifications may be made without departing from the spirit and scope of the appended claims, in which is defined what is believed to be new and desired to have protected by Letters Patent.

I claim:

1. In apparatus serving for the diffraction of X-rays on specimen and for taking the diffraction spectrum thereof and comprising a source of X-rays, a rotatable base for a specimen, means for measuring the intensity of the X-rays emitted from the source of X-rays and diffracted by the specimen, a second rotatable base for the measuring means, said second rotatable base being coaxial with the first rotatable base and being adapted to be turned through twice the angle by which the specimen is turned during the taking of the diffraction spectrum; a diaphragm with variable aperture for regulating the intensity of the X-rays diffracted through the specimen and impinging upon the measuring means, cam means, and means for adjusting the aperture of the diaphragm by said cam means in dependence upon the angle through which the second rotatable base is turned, in such a way that variations of the diffraction intensity due to factors varying with the diffraction angle are compensated, if the second rotatable base has been turned through twice the angle through which the first rotatable base has been turned.

2. In apparatus for the diffraction of X-rays on specimen and for taking the diffraction spectrum thereof, a source of X-rays, a turntable for rotating a specimen with respect to the source of X-rays, a second turntable disposed coaxial with the first turntable, an X-ray detector mounted on the second turntable, a diaphragm with variable aperture mounted on the second turntable so as to regulate the intensity of the X-rays impinging upon the detector, and a stationary cam adapted to control the aperture of the diaphragm in dependence upon the angle through which the second turntable is turned, in such a way that variations of the diffraction intensity due to factors varying with the diffraction angle are compensated, if the second rotatable base has been turned through twice the angle through which the first rotatable base has been turned.

3. In apparatus for the diffraction of X-rays on specimen and for taking the diffraction spectrum thereof, a source of X-rays, a turntable for rotating the specimen with respect to the source of X-rays, a second turntable disposed coaxial with the first turntable, an X-ray detector mounted on the second turntable, a diaphragm with variable aperture mounted on the second turntable so as to regulate the intensity of the X-rays impinging upon the detector, and a stationary cam adapted to control the aperture of the diaphragm in dependence upon the angle through which the second turntable is turned, said stationary cam being shaped according to the formula $$a = F_1(\vartheta) = A \frac{1+\cos^2 2\vartheta}{\sin^2 \vartheta \cos \vartheta}$$

or $$a = F_2(\vartheta) = \frac{1+\cos^2 2\vartheta}{\sin^3 \vartheta \cos \vartheta}$$

in which $a$ = varying level of the cam
$\vartheta$ = angle through which the concentric turntable is turned; starting from an angle $\vartheta_0 = 0$ defined by the fact that the surface of the specimen is parallel to the beam of X-rays.

4. Apparatus for the diffraction of X-rays on specimens and for taking a diffraction diagram of a specimen being examined, comprising an X-ray radiation source, a rotatable support for receiving a specimen and for disposing such specimen in the X-ray path emanating from said source, an indicator device for the X-rays impinging upon said specimen, means for supporting said indicator device for rotation by twice the angle of rotation of said specimen, operating means controlled by the relative angular position between said specimen and said indicator device for governing the intensity of the X-rays diffracted from said specimen and impinging upon said indicator device, said operating means comprising an apertured diaphragm interposed in the path of X-rays diffracted from said specimen and said indicator means, a shutter for varying the aperture of said diaphragm, and means controlled by said indicator device upon rotation thereof for moving said shutter to delimit the aperture of said diaphragm.

5. An apparatus and cooperation of parts according to claim 4, wherein said last named means comprises a rod connected with and extending from said shutter, and stationary cam means for engagement with said rod to effect sliding thereof on said cam means incident to rotation of said indicator means so as to effect displacement of said rod and therewith displacement of said shutter with respect to said diaphragm.

References Cited in the file of this patent

UNITED STATES PATENTS

| | | |
|---|---|---|
| 1,780,398 | Morgan | Nov. 4, 1930 |
| 2,602,142 | Meloy | July 1, 1952 |
| 2,619,600 | Hamacher | Nov. 25, 1952 |